June 9, 1964
J. R. CARNWATH
3,136,090
ELECTRIC HEATING UNIT FOR HOT BED
Filed March 6, 1961
2 Sheets-Sheet 2
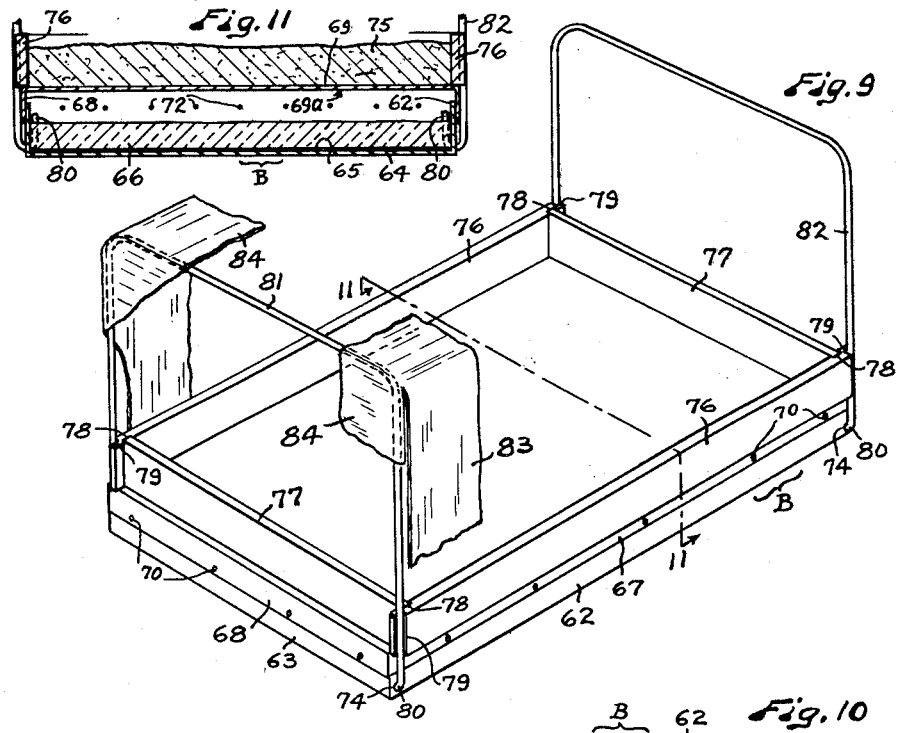
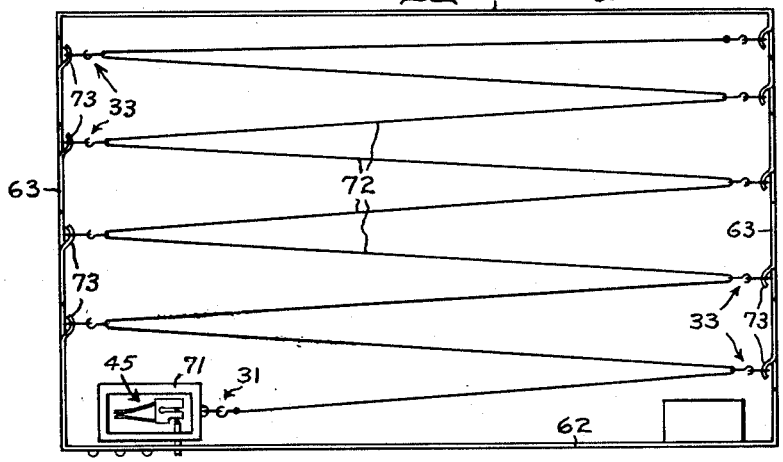
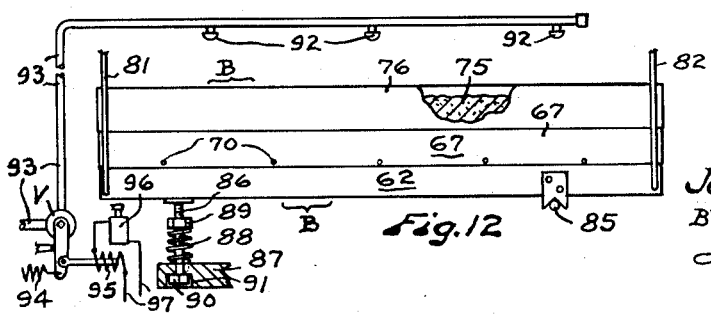
INVENTOR.
James R. Carnwath
BY
Fred C. Matheny
ATTORNEY though
3,136,090
ELECTRIC HEATING UNIT FOR HOT BED
James R. Carnwath, 12024 86th Ave. NE., Kirkland, Wash.
Filed Mar. 6, 1961, Ser. No. 93,525
5 Claims. (Cl. 47—19)

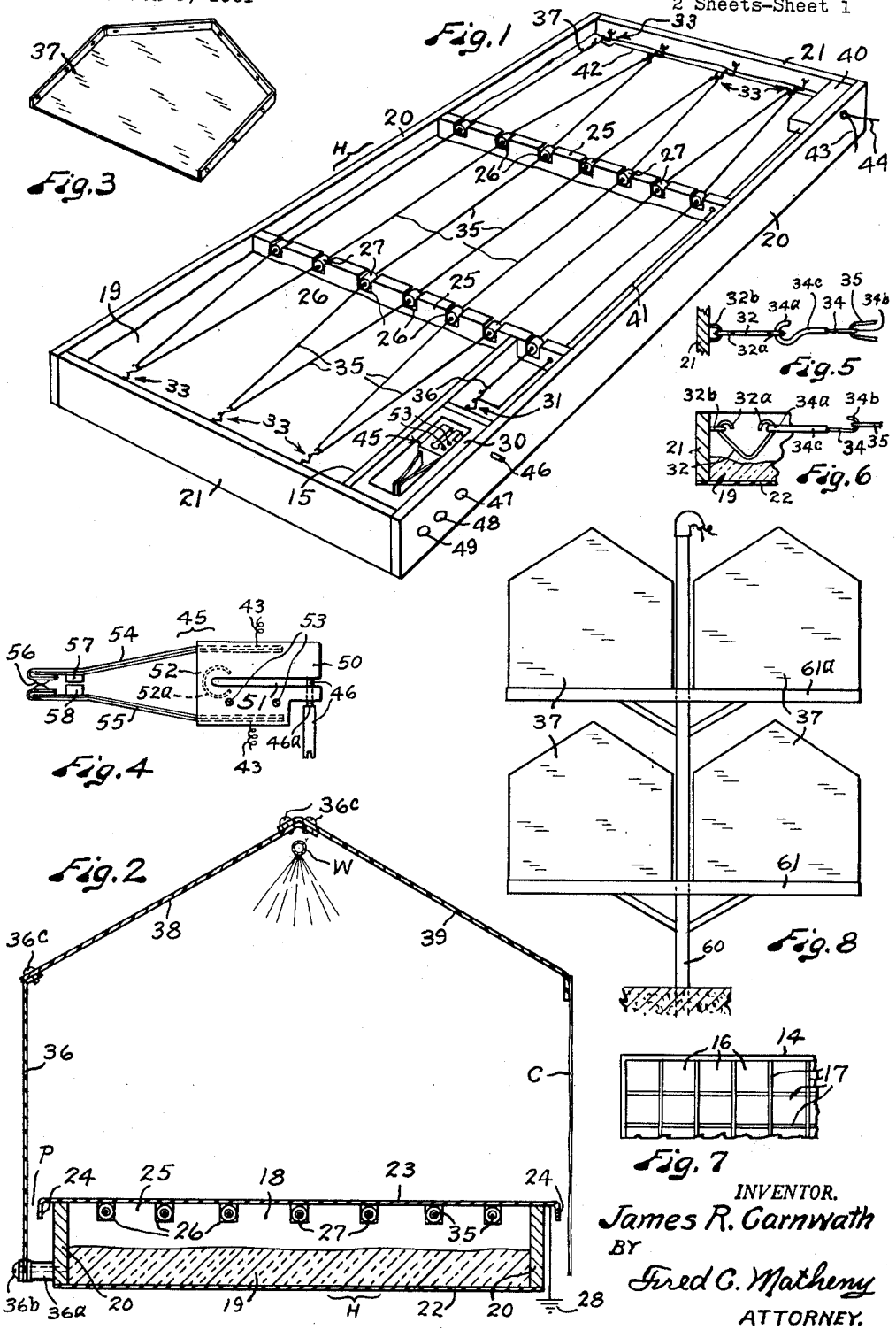

My invention relates to an electric heating unit and said unit is herein described as applied to the heating of soil in hot beds for plant propagation purposes but it can also be used for heating beds for animals and humans, for the out of doors heating of seats in public places and on vehicles and the like, for laboratory heating, for curing and fermentation control, for heating cold engines and for various other heating purposes.

An object of my invention is to provide an electric heating unit for the heating of soil used in plant culture and for like purposes which is simple in construction, not expensive to manufacture, efficient in operation, economical in its consumption of electric current, and one which will continuously maintain the soil and air of a hot bed at a predetermined temperature.

Another object is to provide a hot bed for plant propagation comprising a relatively flat box-shaped heating unit having on it a heat conductive metal cover serving as a support for soil within which plants are propagated and having within it a thermostat and high resistance electric heating wires, the wires being supported in an air space above a bed of heat insulating material which rests on a heat reflective bottom, the thermostat serving to control the supply of electric current to the heating wires and being insulated so that it does not receive much heat directly from the electric heating wires and being close to the heat conductive metal cover so that it senses temperature chiefly through said metal cover and is responsive to the temperature of the layer of soil closest to the metal cover, thus insuring accurate control of the soil temperature and minimizing danger of damage to plants being propagated in this soil due to overheating of the soil and possible root burning of the plants.

Another object is to provide an electric heating unit in which the danger of short circuiting of high resistance electric heating wires is minimized by using springs to support the insulators by which said wires are carried and thus maintaining the wires under a constant spring tension which prevents sagging of the wires due to heating without subjecting said wires to excessive strain.

Another object is to provide an electrically heated hot bed in which deterioration of a thermostat and high resistance electric heating wires is minimized because these parts are supported in air and are not embedded in soil or water or the like.

Other objects are to provide thermostatically controlled electric heating units in which electric wiring requirements and shock hazards are reduced to a minimum and in which the need for a thermostat housing external to the heating unit is eliminated.

Other objects are to provide a hot bed comprising a heating unit having a metal top adapted to have soil or flats which contain soil placed directly thereon, thus doing away with the need for benches of the type commonly used in greenhouses, said metal top being leak-tight and durable and being proof against infestation and contamination by undesirable spores, fungus, bacteria and the like and being well adapted to support soil in which plants are being propagated or soil which is being sterilized or pasteurized by the application of heat thereto.

Other objects of my invention will be apparent from the following description and accompanying drawings.

In the drawings FIGURE 1 is a perspective view, with the cover plate removed, showing a hot bed heating unit of fairly large size constructed in accordance with my invention.

FIG. 2 is a cross sectional view, on a larger scale than FIG. 1, showing this heating unit and showing the upper frame and enclosure structure of a hot bed applied thereto.

FIG. 3 is a detached perspective view on a smaller scale than FIG. 2, showing an end wall of the enclosure structure which is shown in FIG. 2.

FIG. 4 is a detached plan view of an adjustable thermostatic switch which may be used in my heating unit for temperature control purposes.

FIG. 5 is a fragmentary plan view of insulated spring devices used for supporting electric heating cables.

FIG. 6 is a side elevation, with parts in section, of the insulated spring heating cable supporting devices shown in FIG. 5.

FIG. 7 is a fragmentary plan view of a plant propagation tray with individual plant compartments, which can be used in connection with my hot bed.

FIG. 8 is a somewhat diagrammatic end view showing hot bed supporting means of preferred form and showing four of my hot beds supported thereby.

FIG. 9 is an isometric view showing a hot bed of smaller size than the one shown in FIG. 1, the heating unit thereof being of modified form and the plant enclosure part being partly broken away.

FIG. 10 is a somewhat diagrammatic detached plan view of the lower section or tray of the hot bed shown in FIG. 9, said tray containing the electric heating wires.

FIG. 11 is a view in cross section taken substantially on broken line 11—11 of FIG. 9, showing the hot bed with soil therein.

FIG. 12 is a somewhat diagrammatic view illustrative of automatic watering device which can be used in connection with my hot bed.

Like reference numerals refer to like parts throughout the several views.

The heating unit shown in FIGS. 1 to 8 is designated generally by the letter H. It comprises a shallow rectangular receptacle or box consisting of side walls 20, end walls 21, a bottom 22 and a top or cover 23. Preferably the side walls 20 and end walls 21 are of wood and the bottom 22 is of heat reflective material, such as heat reflective sheet metal or ordinary sheet metal with a heat reflective foil laid on it. When my heating unit is used for hot bed purposes the top or cover plate 23 becomes a soil supporting plate and receives soil directly or receives trays or flats or like receptacles which contain soil. Said cover 23 is of water tight heat conductive material, preferably sheet metal and it preferably has a coat of black paint on its under side to minimize heat reflection and increase heat absorption or conduction. Said cover 23, being of sheet metal, is preferably grounded, as indicated diagrammatically by 28, FIG. 2.

A layer of heat insulating material 19, of a depth preferably equal to about one half of the thickness of the heating unit H is provided within said heating unit and rests on the bottom 22 thereof. This leaves an air chamber 18 between the top plate 23 and the top of the heat insulating material 19. The cover plate 23 is slightly wider and longer than the receptacle it covers and is positioned so that it overhangs both of the side walls 20 and both of the end walls 21 and the edges of said cover plate, all of the way around the same, are bent downwardly to form drip flanges 24. Excess moisture applied to soil and vegetation on said cover plate 23 will discharge over the flanges 24 without danger of wetting the lower part of the heating unit H, in which electric heating devices are disposed.

Two transverse insulator supports 25 are provided in the receptacle formed by sides 20, ends 21 and bottom 22. The supports 25 are spaced about equal distances from the end walls 21 and about the same distance from each other. The insulator supports 25 are flush with the end walls 21 and side walls 20 at the top and they cooperate in supporting the cover plate 23, a plurality of spaced apart notches 26 are provided in the upper edges of the insulator supports 25 and a tubular insulator 27 is provided in each notch 26. A thermostat housing 30 formed of heat insulating material is provided in one corner of the heating unit receptacle. Preferably a partition member 15 is positioned alongside of the thermostat housing 30 to exclude heat from the adjacent side of said housing 30. One insulated resilient heating element support 31, of a type more fully shown in FIGS. 5 and 6 and hereinafter described, is attached to an end wall of the thermostat housing 30 and a plurality of other similar insulated resilient heating element supports 33 are attached to the end walls 21 of the heating unit H.

A high resistance electric heating wire or element 35 has one end 36 secured to the heating element support 31 adjacent the thermostat housing 30 and is thence passed back and forth through or around the insulators 27 and heating element supports 33 to provide a predetermined number of side by side spaced apart laps of said heating element 35 and has its other end 37 secured to one of the heating element supports 33 approximately diagonally opposite to the support 31. It has been found that the heat is more evenly distributed and heat losses better compensated for around the perimeter of the unit if the laps of heating wire 35 near the sides 20 are closer together than are the medially disposed laps of said wire. The insulators 27 and heating element supports 31 and 33 are all positioned in a common plane near but below the plane of the cover plate 23 so that they will support the heating element 35 in the air chamber 18 in spaced relation below the cover plate 23 and above the top surface of the heat insulating material 19.

Preferably each resilient heating wire support 31 and 33, see FIGS. 5 and 6, comprises a piece of spring wire 32 of approximately V shape having two hook shaped loops 32a on its respective ends, formed by bending. One loop 32a of each spring wire 32 is attached to an end wall 21 of the heating unit H or to an end wall of the thermostat housing 30 by a staple 32b of like device. The other loop 32a of each spring wire 32 is engaged with an insulated hook 34a on one end of a connector wire 34. Another hook 34b on the other end of the connector wire 34 is adapted to be engaged with a loop or bend of the heating cable 35. The connector wire 34 is herein shown to be a piece of bare wire having a tube of flexible insulating material 34c slipped over the end thereof which is engaged with the staple 32b, leaving the other end portion of said connector wire 34 bare so that electrical connections to heating element 35 can be made with the non-insulated part of the connector wire 34. However, it will be understood that each connector wire 34 may be made from a piece of wire which is insulated throughout its entire length. The above described devices form a convenient, inexpensive and efficient support for the electric heating element 35.

The insulated resilient heating element supports just described exert a constant but not strong tension on the electric heating element 35 and prevent sagging, bending and short circuiting of said heating element when it expands due to heat. The cover plate 23 readily transmits heat from the air in chamber 18 to the soil and plant growing areas above said cover plate. The heat insulating material 19 minimizes loss of convected heat. Much of the radiant heat from the heating element 35 which penetrates the insulating material 19 is reflected by the heat reflective bottom 22 back upwardly against the cover plate 23 and is transmitted by said cover plate 23 to the soil and plant areas above it.

An electrical outlet box 40 is provided within the heating unit H and two electrical conductors 41 and 42 from said outlet box 40 are connected respectively with the end portions of the electric heating element 35. Suitable circuit wires 43 and 44 supply current to the outlet box 40. A thermostatic switch 45 is disposed within the thermostat housing 30. This switch 45 operates either directly or indirectly to close the circuit represented by wires 43 and 44 which supply current to the electric heating element 30.

The thermostat housing 30 is of heat insulating material and excludes from the thermostat switch 45 most of the direct heat from the heating element 35 and most of the heat from the air chamber 18. The cover plate 23 rests directly on the top of the thermostat housing 30 and the thermostatic switch 45 is responsive chiefly to temperature changes sensed through said cover plate 23. The temperature of the plate 23 corresponds closely to the temperature of the soil, which can be supported directly on said cover plate 23 or can be in trays or flats which rest on said plate 23. This obviates cycling of the thermostat switch 45 such as might occur if it were subjected directly to the temperature of the air in the air space 18. An adjusting screw 46 is accessible from the exterior of the heating unit H for adjusting the thermostat switch 45, as hereinafter explained in connection with FIG. 4. Also preferably a heat indicator light 47, a power indicator light 48 and a moisture control indicator light 49 are provided adjacent the switch adjusting screw 46 and are visible from the exterior of the heating unit H. The heat indicator light is in the thermostat circuit and is lighted only when the thermostat switch 45 is closed. The power indicator light 48 is connected ahead of the thermostat switch 45 in the power circuit exemplified by wires 41 and 42 and will be lighted at all times except when these wires are de-energized. The moisture control indicator light will be used if automatic moisture supply means of the form shown in FIG. 12 and hereinafter described is used. This use is optional.

An upper housing structure is supported from the heating unit H and positioned above the same and provides a suitable enclosure in which plants may be propagated. All parts of this housing structure except one side thereof are preferably formed sheets of translucent fiber glass, these sheets being self supporting and fairly substantial and durable and being capable of transmitting the light needed by and beneficial to growing vegetation. Said upper housing structure comprises a side member 36, two end members 37 of duplicate construction, one of which is shown on a reduced scale in FIG. 3, two roof members 38 and 39 and one pliable curtain type inside member C. The side member 36 and the two end members 37 are supported in an upright position from the heating unit H, preferably by spacer blocks 36a and screws 36b. The spacer blocks 36a space the side 36 and ends 37 outwardly from a side 20 and the ends 21 of the heating unit H far enough so they will not interfere with the drip or overflow from the flanges 24 and will leave a passageway P for the circulation of air along the side 36 and ends 37. Where the marginal portions of the side 36 and ends 37 and roof members 38 and 39 adjoin they overlap one another and are formed at an angle or slope conforming to the angle or slope of the part they adjoin and the said overlapping parts are secured together by screws 36c or by like fastening means. This overlapping of the upper housing parts where they adjoin reinforces and strengthens the structure and facilitates the use of thin fiber glass in constructing fairly large panels for upper housings. The curtain type side member C is pliable and light conductive and it affords free and easy access to the interior of the upper housing. Said side member C can be formed of polyethylene.

Preferably a longitudinally extending water spray pipe W is provided in the apex of the plant enclosure part, as shown in FIG. 2.

One thermostatic switch suitable for use with my heating units is shown in FIG. 4. This switch comprises a block 50 of molded insulating material. The block 50 has a longitudinal slot 51 which extends from one end thereof toward the other end but terminates short of said other end so as to leave a fairly narrow flexure section 52 between the inner end of the slot 51 and the adjacent end of the block 50. An arcuate metal spring 52a, which is less than a complete circle, is embedded in the flexure section 52 of the block 50 to increase the resiliency of the block 50 at this location. The block 50 is mounted within the thermostat housing 30 in such a manner that the two parts thereof on opposite sides of the slot 51 can be moved relative to each other. Screws 53 in the part of the block 50 at one side of the slot 51 can be used to secure said block to the thermostat housing 30 and leave the two sides thereof relatively movable. The previously mentioned adjusting screw 46 is threaded through a portion of the block 50 at one side of the slot 51 and bears against the portion of said block at the other side of the slot 51. Preferably a shoulder 46a is provided on the screw 46 to serve as a stop member which will contact an adjacent part of the block 50 and limit movement in one direction of said screw 46.

Two bi-metallic contact arms 54 and 55 are rigid with the two oposite edge portions of the block 50. Preferably these contact arms 54 and 55 are embedded in said block and extend outwardly from one end of said block in convergent relation. The outer end portions of said contact arms 54 and 55 are substantially parallel and carry contact members or points 56 through which a circuit is closed when said points abut against each other. A permanent magnet 57 is secured to one of the contact arms 54 and an attractor plate 58 is secured to the other contact arm 55 in opposed relation to the magnet 57 and a short distance from the points 56. Heat variations will cause the two contact arms 54 and 55 to flex toward and away from each other to open and close the circuit through the points 56. Obviously this thermostatic switch mechanism will operate if only one of the contact arms 54 or 55 is of bi-metallic construction. Rise of temperature will cause the contact arms 54 and 55 to move apart and break the circuit through points 56. Lowering of the temperature will cause said arms to move toward each other and close the circuit through points 56. The magnet 57 and attractor plate 58 insure a quick make and break of the points 56, making the switch more reliable and minimizing the danger of arcing and thus reducing the danger of heating.

In using the hot bed shown in FIGS. 1 to 6 the soil for the seeds or plants will usually be handled in shallow trays, ordinarily called flats. A fragment of one type of flat suitable for use in this hot bed is shown in FIG. 7. This flat consists of a shallow rectangular receptacle 14 which is divided into a plurality of small cubical compartments 16 by partitions 17. The partitions 17 extend crosswise of each other like the dividers of an egg crate. The division of the flat into the small cubical compartments 16 makes it possible to start one plant in each compartment. The partitions 17 keep the roots of the plants separated from each other. Keeping the plants and the roots separate from each other facilitates handling them one at a time in transplanting.

A preferred manner of mounting and supporting four of my hot beds is illustrated in FIG. 8. Said FIG. 8 shows a supporting frame comprising at least two upright spaced apart posts 60, only one of which is shown, having lower cross bars 61 and upper cross bars 61a secured thereto. Two of my hot beds are supported on the lower cross bars 61 on opposite sides of the posts 60 and two similar hot beds are supported on the upper cross bars 61a. The posts 60 can be embedded in the ground or floor and said posts are preferably pipes and form convenient conduits for electric circuit wires, which can be the wires 43 and 44 shown in FIG. 1. The four hot bed units are thus supported in such a manner that they occupy a minimum amount of space and are convenient of access. If the installation is in a conventional greenhouse the need for the usual benches is done away with.

FIGS. 9 to 12 inclusive disclose a hot bed of smaller size but of similar construction to the one shown in FIGS. 1 to 8 and which is well adapted for home use. This hot bed comprises a rectangular heating unit, indicated generally by reference character B. The heating unit B is preferably formed of two sheet metal pans or trays fitted together telescopically with their concave sides facing each other. The lower pan or tray comprises side walls 62, end wals 63 and a bottom 64. A sheet of heat reflective metal foil 65 is disposed within the lowermost tray and rests on and covers the bottom 64 thereof. In FIG. 11 I show a layer of heat insulating material 66 resting on the foil 65. This heat insulating material can be omitted since the foil 65 will reflect the radiant heat and there will not be much loss from convected heat. The upper inverted tray or pan part is formed of side walls 67, end walls 68, and a top wall 69, all of heat conductive sheet metal. Preferably the lowermost surface 69a, FIG. 11, of the top plate 69 is coated with black paint to render this top plate 69 more heat conductive. The upper tray part fits telescopically over the lower tray part so that downflowing water will be prevented from entering the lower tray part. The two tray parts may be secured together by sheet metal screws 70.

A thermostat housing 71 is provided in one corner of the lower tray part of the heating unit B. A thermostatic switch 45 of the form hereinbefore described can be provided in the housing 71. The housing is deep enough so that it extends above the level of the top of the lower tray part and the top wall of the upper tray part rests on its so that temperature is sensed through said top wall 69. The electric heating means in the unit B is similar to that in my previously described unit H. Said heating means comprises an electric heating element 72 supported from the thermostat housing 71 and the ends 63 of the lower tray member by heating element supports 31 and 33 of the form hereinbefore described. Clips 73 to which the springs of the heating element supports 33 may be attached are formed by displacing parts of the end members 63 of the lower tray. In this smaller unit, which is of short length, no intermediate supports for the heating element 72 is required. The electric current supply means and the signal lamps and control devices of the smaller unit B can be substantially the same as they are for the previously described larger unit H.

In the smaller unit provision is made for placing a bed of soil 75, FIG. 11, directly on the top plate 69 within a receptacle formed by two upright side members 76 and two upright end members 77, all of which can be made of wood. The inner side of each side member 76 is provided, adjacent each end thereof, with a transverse groove 78 to receive an adjacent end portion of one of the end members 77 so that the end members 77 will be held in upright assembled positions. Also the outer side of each end portion of each side member 76 is provided with a transverse L shaped notch 79 to receive an upright portion of a foldable frame 81 or 82 of inverted U shape.

The lower end portion of each upright side part of each frame 81 and 82 is reversely bent inwardly to form a hook 80 which is hooked into a suitable perforation 74 in a lowermost corner portion of a side wall 62 of the lower tray of heating unit B, the tip of each hook 80 being inside of the tray. This pivotally attaches each frame member 81 and 82 to an end portion of the heating unit B. The upwardly extending tip portions of the hooks 80 prevent outward swinging movement of the frames 81 and 82 much past a vertical position. The frame members 81 and 82 are adapted to extend through the notches 79 and hold the tray members 76 and 77 in the assembled position shown in FIG. 9. Removal of the soil tray members 76 and 77 allows the U shaped frame members 81 and 82 to be folded inwardly and downwardly onto the top of the heating unit B. The end notches 79 in the side members 76 of the soil tray limit inward swinging movement of the frame members 81 and 82 when these parts are in assembled position. A pliable enclosure member 84 of light conductive material, such as polyethylene is properly shaped and constructed so it can be draped over the frame members 81 and 82 to enclose and protect vegetation therein. Preferably at least one side of the enclosure member 84 is left unattached at the corners so it forms a flap 83 which can be thrown up and back on said enclosure to afford access to the interior. Air for ventilation purposes can enter around the bottom of the enclosure member 84, which hangs loosely around the heating unit B.

FIG. 12 shows, somewhat schematically, a water control means and a manner of mounting one of my hot beds so that the supply of water to vegetation and soil thereon will be automatically controlled by variations in the weight of the water in the soil. For purpose of illustration the hot bed shown in FIG. 12 is the one disclosed in FIGS. 9 to 11 but it can equally well be the one shown in FIGS. 1 to 8.

In said FIG. 12, one end portion of the hot bed heating unit B is pivotally supported on a fulcrum member 85 and the other end portion thereof is movably supported by one or more adjustable spring assemblies. The spring assembly shown by way of illustration comprises a bolt 86 guided in a fixed support 87 and at least part of the weight of the movable end portion of the heating unit B rests on the upper end of said bolt 86. A compression spring 88 on the bolt 86 between a nut 89 and the support 87 carries part of the weight of the hot bed. The resistance offered by the spring 88 can be varied by adjusting the nut 89. A head 90 of square or like cross section on the bolt 86 is longitudinally movable but held non-rotatable in a recess 91 in the support 87 and said head 90 limits movement of the bolt 86 in an upward direction.

Spray nozzles 92 connected with a water supply pipe 93 can be used to supply water to soil and vegetation on the heating unit B. A valve V is interposed in the pipe 93. A spring 94 normally holds the valve V closed. A solenoid 95 is connected with the valve V and will open said valve when said solenoid is energized. A self opening switch 96 controls the supply of energy through circuit wires 97 to the solenoid 95. The switch 96 is adapted to be closed by downward movement of the movably supported end portion of the heating unit B.

Except for water added to or evaporated from the seed bed 95 and vegetation sustained thereby the weight of the heating unit B and parts supported thereby will be fairly constant. If the weight supported by the spring 88 exceeds an amount determined by the setting of the nut 89, as it will when there is ample water in the soil, the end portion of the hot bed supported by said spring 88 will move downwardly and open the switch 96 and the valve V will be closed and held closed by the spring 94. As the seed bed 75 dries out, but before it loses enough water to adversely effect the vegetation sustained thereby the movable end portion of the hot bed will be moved upwardly by the spring 88, allowing the switch 96 to close, energizing the solenoid 95 and opening the valve V and supplying more water to the seed bed.

The foregoing description and accompanying drawings clearly disclose preferred embodiments of my invention but it will be understood that this disclosure is merely illustrative and that changes may be made within the scope of the following claims.

I claim:

1. In an electric heating unit, a shallow rectangular frame; a sheet of heat reflective material forming a bottom for said frame; spaced apart insulator supports transversely disposed in said frame flush with the top plane of said frame; spaced apart insulators carried by said insulator supports; a top plate formed of a sheet of thin waterproof heat conductive material covering the top of said frame, said top plate being close to said insulators and resting on and being supported by said insulator supports; a layer of heat insulating material in said frame on said heat reflective bottom and spaced below said heat conductive top plate providing an air chamber between said insulating material and said top plate; an electric heating element disposed horizontally in the upper portion of said air chamber close to said top plate and extending back and forth in said air chamber longitudinally of said frame and passing through the insulators in said insulator supports; and resilient heating element supporting devices connecting said heating element with the end walls of said frame supporting said heating element and maintaining the same under tension.

2. In a hot bed, an electric heating unit comprising a shallow completely enclosed receptacle having side walls and a heat reflective bottom wall and a soil supporting heat conductive top wall; an enclosure for growing vegetation provided above said soil supporting heat conductive top wall; an electric heating element supported within said receptacle; a thermostat switch housing of heat insulating material disposed within said receptacle; the interior of said thermostat switch housing being insulated against heat contained within said receptacle, said heat conductive top wall forming the sole cover of said thermostat switch housing whereby the temperature within said switch housing is responsive to the temperature of said heat conductive top wall; and a thermostatic switch within said switch housing responsive to the temperature sensed through said heat conductive top wall and controlling the supply of electric current to said electric heating element.

3. The apparatus as claimed in claim 2 in which the thermostat switch is adjustable and a switch adjusting member is connected with said switch and extends to and is operable from the exterior of said receptacle.

4. In a hot bed an electric heating unit comprising a shallow frame; a plane flat sheet of heat reflective material forming a bottom for said frame; a plane flat soil supporting top plate of heat conductive material covering the top of said frame; a layer of heat insulating material in said frame on said heat reflective bottom and spaced below said top plate leaving an air chamber between said top plate and said heat insulating material; an electric heating element supported in said air chamber between said top plate and said insulating material; a thermostat switch housing of heat insulating material within said frame in heat insulating relation to said air chamber, the top wall of said thermostat switch housing being formed by said heat conductive top plate; a thermostatically operated switch within said switch housing sensing temperature through said top plate and controlling the supply of electric current to said heating element; and an upper frame structure of light conductive material supported by and extending above said heating unit forming an enclosure for growing vegetation.

5. In a hot bed, an electric heating unit comprising a shallow frame; heat reflective material forming a bottom for said frame; a soil supporting top plate of heat conductive material resting on and covering and overhanging the edges of said frame; a downwardly directed water excluding flange extending continuously around the perimeter of said top plate in outwardly spaced relation from said frame; an enclosure for growing vegetation disposed above said top plate and supported by said frame; and an electric heating element disposed within said frame between said top plate and said heat reflective bottom.

References Cited in the file of this patent

UNITED STATES PATENTS

| | | |
|---|---|---|
| 269,760 | Weston | Dec. 26, 1882 |
| 524,646 | Newbury | Aug. 14, 1894 |
| 927,245 | Jackson | July 6, 1909 |
| 1,065,015 | Youmans | June 17, 1913 |
| 1,555,675 | Kruszynski | Sept. 29, 1925 |
| 1,619,791 | Fritch et al. | Mar. 1, 1927 |
| 1,954,674 | Lager | Apr. 10, 1934 |
| 1,958,983 | Albanese et al. | May 15, 1934 |
| 2,002,380 | Wernicke et al. | May 21, 1935 |
| 2,014,657 | Marshall et al. | Sept. 17, 1935 |
| 2,715,794 | Atkinson | Aug. 23, 1955 |
| 2,963,819 | Hoch | Dec. 13, 1960 |